(12) United States Patent
Eberman et al.

(10) Patent No.: US 6,314,392 B1
(45) Date of Patent: *Nov. 6, 2001

(54) METHOD AND APPARATUS FOR CLUSTERING-BASED SIGNAL SEGMENTATION

(75) Inventors: Brian S. Eberman, Somerville; William D. Goldenthal, Cambridge, both of MA (US)

(73) Assignee: Digital Equipment Corporation, Maynard, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,391

(22) Filed: Sep. 20, 1996

(51) Int. Cl.$^7$ .................................................. G10L 21/00
(52) U.S. Cl. ..................... 704/217; 704/236; 704/237; 704/238; 704/239; 704/240; 704/251; 704/254
(58) Field of Search .................................. 704/236, 237, 704/238, 239, 240, 251, 254

(56) References Cited

U.S. PATENT DOCUMENTS

| | | | |
|---|---|---|---|
| 3,919,479 | * 11/1975 | Moon et al. | 704/237 |
| 4,227,177 | * 10/1980 | Moshier | 704/231 |
| 4,241,329 | * 12/1980 | Bahler et al. | 704/231 |
| 4,489,434 | * 12/1984 | Moshier | 381/43 |
| 4,665,548 | * 5/1987 | Kahn | 704/237 |
| 5,119,425 | * 6/1992 | Rosentrach et al. | 381/51 |
| 5,261,007 | * 11/1993 | Hirsch | 704/237 |
| 5,625,749 | * 4/1997 | Goldenthal | 395/2.63 |
| 5,745,873 | * 4/1998 | Braida et al. | 704/222 |
| 5,787,394 | * 7/1998 | Bahl et al. | 704/238 |
| 5,835,087 | * 11/1998 | Herz et al. | 345/327 |

* cited by examiner

*Primary Examiner*—Krista Zele
*Assistant Examiner*—Michael N. Opsasnick
(74) *Attorney, Agent, or Firm*—Cesari and McKennna

(57) ABSTRACT

In a computerized method a continuous signal is segmented in order to determine statistically stationary units of the signal. The continuous signal is sampled at periodic intervals to produce a timed sequence of digital samples. Fixed numbers of adjacent digital samples are grouped into a plurality of disjoint sets or frames. A statistical distance between adjacent frames is determined. The adjacent sets are merged into a larger set of samples or cluster if the statistical distance is less than a predetermined threshold. In an iterative process, the statistical distance between the adjacent sets are determined, and as long as the distance is less than the predetermined threshold, the sets are iteratively merged to segment the signal into statistically stationary units.

17 Claims, 4 Drawing Sheets

METHOD AND APPARATUS FOR CLUSTERING-BASED SIGNAL SEGMENTATION

FIELD OF THE INVENTION

The present invention relates generally to signal processing, and more particularly to segmenting continuous signals.

BACKGROUND OF THE INVENTION

Accurate identification of statistically stationary units in a continuous signal can lead to a substantial reduction in computational costs while processing the signal. Statistically stationary units are discrete portions of the continuous signal that have characteristics which can statistically be described in a similar manner.

The identification of the stationary units requires the location of segment boundaries. If the segment boundaries are correctly hypothesized, then the effort required to correlate information related to the units is greatly reduced. Segmentation is particularly difficult where there is little prior knowledge about the underlying content of the signal.

For example, in a speech recognition system, a continuous signal is processed to determine what has been spoken. Segmentation of the signal into statistically stationary units is an important sub-process in a segment-based speech processing system. Segmentation identifies possible boundaries of portions of the signal which are likely to correspond to linguistic elements.

Accurate identification of statistically stationary units can lead to a substantial reduction in computational costs. If the segment boundaries are correctly hypothesized, then the time to search a database for corresponding linguistic elements is greatly reduced. Segmentation is particularly difficult where there is little prior knowledge about the content of the signal.

Most signal processing systems receive the signal in a continuous analog form. The analog signal is typically sampled at a fixed rate to produce a sequence of digital samples which can be processed by a computer system.

One prior art segmentation technique, as described by R. Andre-Obrecht in *Automatic Segmentation of Continuous Speech Signals*, Proceedings of IEEE-IECEF-ASJ International Conference on Acoustic, Speech Signal Processing, Vol. 3, pp. 2275–2278, April 1986, uses a statistical approach to detect spectral changes in the continuous signal. The technique processes the signal sample-by-sample using three fixed windows.

A first window is a growing window which starts at the first sample after the time of the last detected change and ends at the current measurement Thus, the first window includes all of the measurements after the last detected change. A second window starts at the first sample after the time of the last detected change, and ends a fixed L samples before the current measurement. Thus, the second window overlaps the first window for all of the samples except the last L samples. A third window starts after the second window, and ends with the current measurement. Thus, the second window combined with the third window includes all of the measurements included in the first window without any overlapping.

The technique uses these three windows to compute a sequential likelihood ratio test on the samples within the windows. The likelihood that all of the measurements since the last detected change belong to one statistical unit is computed using the first window. The likelihood is compared with the likelihood that the measurements belong to two statistical units with the change occurring L samples in the past from the current measurement. In the likelihood ratio test, the first window encodes the null hypothesis of no change in the samples, while the second and third window encode the change hypothesis.

The samples are sequentially processed in the temporal order of the signal by advancing each of the three windows. In a variant, the samples of the signal are processed both forward and backward in time, and the resulting segment boundaries are combined to form one segmentation.

In another variant, a plurality of windows can be used for the change hypothesis. In this case, each window corresponds to a plurality of lengths L. All variants of this technique tend to be computationally intensive since they work directly on the individual samples. Moreover, since the samples are processed in a temporal order, once samples have been identified with a particular segment, the samples are not re-examined. This sequential processing may generate erroneous boundaries.

In another segmentation approach, the samples of the signal are first grouped into a sequence of fixed-length overlapping frames. These frames are then converted to derived observation vectors by applying a windowing vector, typically a Hamming window, to each frame resulting in a sample vector. A fast Fourier transform is then applied to each sample vector to produce the final derived observation vectors. The overlapping of the frames results in substantial smoothing of spectral changes in the signal with time. This smoothing makes it more difficult to detect the changes. Furthermore, application of the windowing vector also results in a smoothing of the spectrum in the frequency domain. This also decreases the size of spectral changes.

The parameters of the observation vectors can be Mel-frequency power spectral coefficients (MFSC), or Mel-frequency cepstral coefficients (MFCC) as described by P. Mennelstein and S. Davies in *Comparison of Parametric Representation for Monosyllabic Word Recognition in Continuously Spoken Sentences*, IEEE Trans ASSP, Vol. 23, No. 1, pages 67–72, February 1975.

The observation vectors can be combined using a hierarchical clustering technique, see for example, J. R. Glass, *Finding Acoustic Regularities in Speech, Applications to Phonetic Recognition*. Ph.D. Thesis. Department of Electrical Engineering and Computer Science, MIT. May 1988. In this technique, successive adjacent vectors are merged using some similarity metric. For example, the techniques can determine the "difference" or distance between adjacent vectors. If the distance between any pair of adjacent vectors is less than some predetermined threshold, the vectors are merged to form a cluster. This process is repeated on the thus merged clusters until the distance between any two adjacent clusters is greater than the threshold. At this point the clusters can be identified with linguistic elements.

For observation vectors expressed with MFCCs, the measure of difference can be a normalized distance. For example, the normalized distance between two measurement vectors x and y is:

$$d(x, y) = \frac{x^T y}{|x||y|}$$

Slightly better results can be obtained if a weighted Euclidean distance is measured between the logarithms of the MFSCs. The problem with this type of clustering is that some of the information present in the raw digital samples is lost in the derived observation vectors, leading to less than optimal segmentation results.

It is desired to directly segment a continuous signal without initially reducing the signal to a sequence of derived observation vectors using overlapping frames. Furthermore, it is desired to segment a signal without having prior knowledge about the content of the signal. In addition, it is desired to segment the signal such that transcription error rates are reduced.

SUMMARY OF THE INVENTION

In a computerized method, a continuous signal is segmented in order to determine statistically stationary units of the signal. The continuous signal is first sampled at periodic intervals to produce a timed sequence of digital samples. Fixed numbers of adjacent digital samples are grouped into a plurality of disjoint sets of samples, for example, the sets are non-overlapping frames.

Next, statistical distances between the samples of adjacent pairs of sets or frames are determined to produce a set of statistical distances. Adjacent sets of samples are merged into a larger set of samples, or clusters, if the statistical distance between them is less than a predetermined threshold value.

The process of measuring, and merging is iteratively performed until all of the statistical distances between adjacent sets of samples are at least the threshold distance to segment the signal into statistically stationary units.

In one aspect of the invention, the samples of the frames are represented by a statistically sufficient description, for example, an autocorrelation matrix generated by a product summing technique. Summing the matrices of adjacent sets of samples is equivalent to merging the raw samples.

In another aspect of the invention, the continuous signals are speech signals, and the statistically stationary units are related to linguistic elements.

DETAILED DESCRIPTION OF PREFERRED EMBODIMENTS

Figure 1:
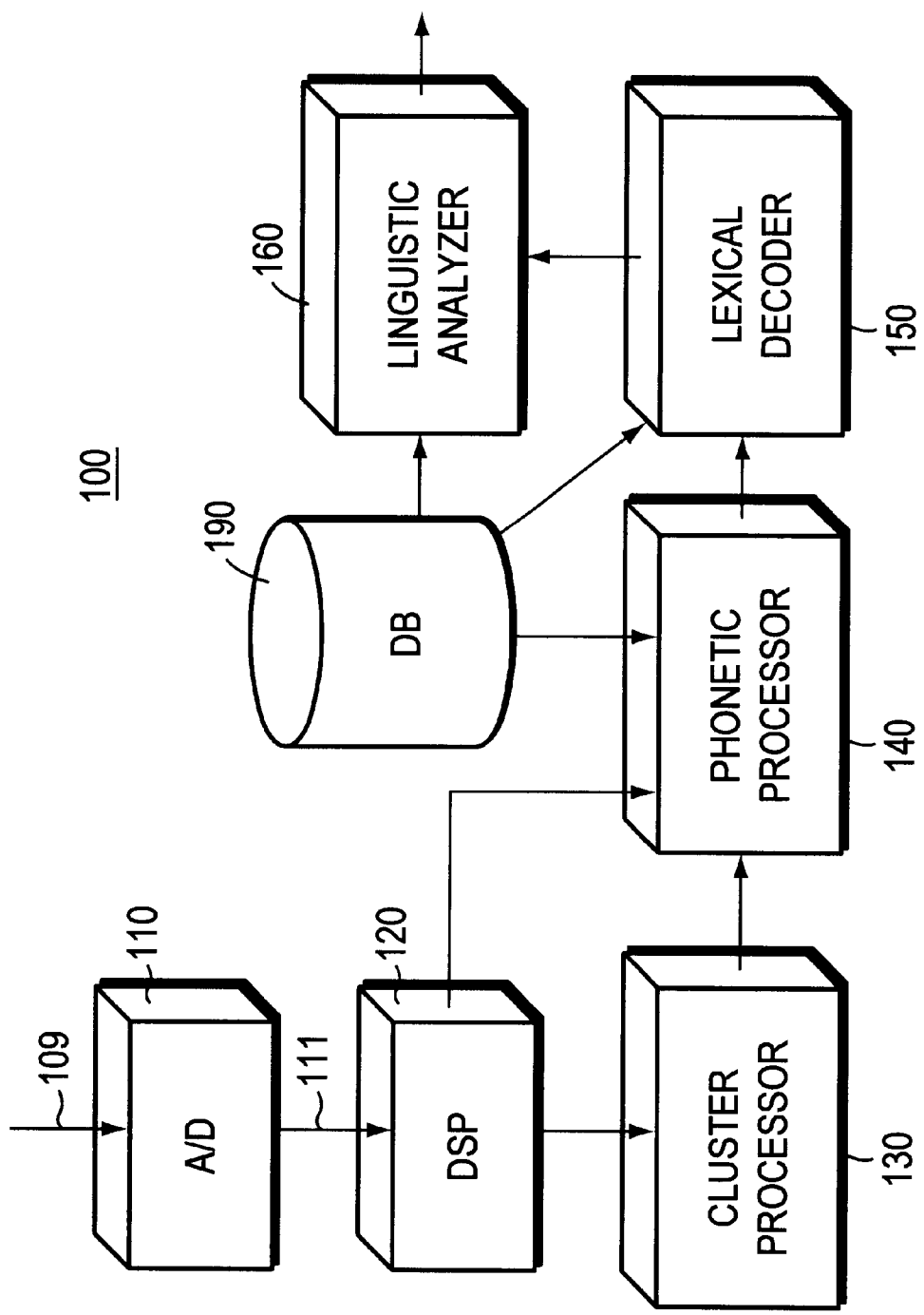
FIG. 1 is a block diagram of a signal processing system according to the invention.

With reference to the drawings, FIG. 1 shows one embodiment of a signal processing system 100 which uses the invention. The system 100 includes an analog-to-digital converter (A/D) 110, a digital signal processor (DSP) 120, a cluster processor 130, a phonetic processor 140, a lexical decoder 150 and a linguistic analyzer 160 connected to each other. The system 100 also includes a database (DB) 190 for storing phonetic, lexical, and linguistic information.

Figure 2:
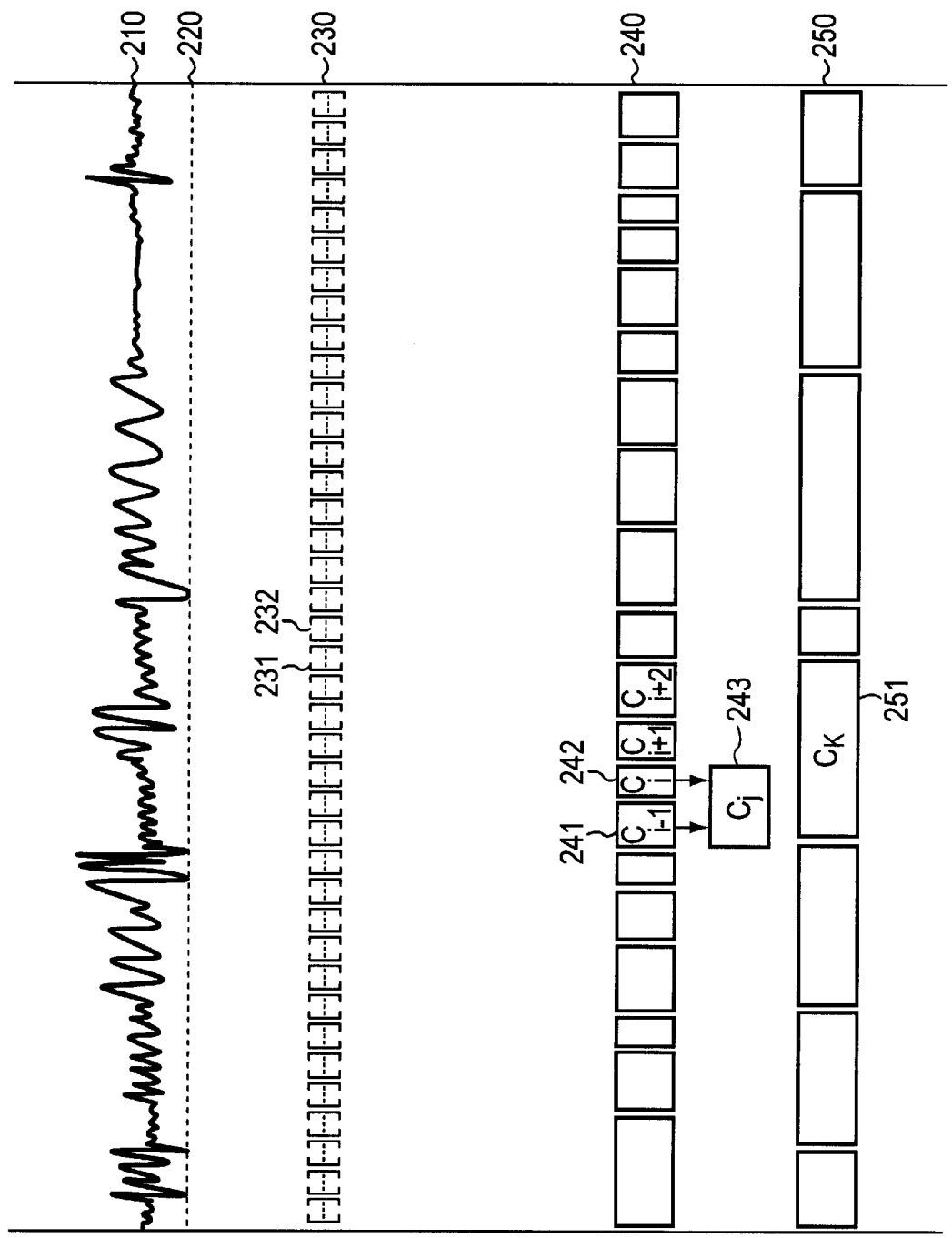
FIG. 2 is a timing diagram of clusters corresponding to statistically stationary units directly produced from a raw continuous signal.

A general operation of the system 100 is described also with reference to FIG. 2. The A/D 110 receives a continuous signal 210 on line 109, for example, speech signals. The signal 210 can be acquired from a microphone connected locally to the A/D 110, or the signal 210 can be received from sensor at a remote location via a communications network, such as the telephone system, or the Internet.

The A/D 110 periodically samples the continuous signal 210 to form a timed sequence of digital signals 220 on line 111 using a sampling rate of, for example, 16 KHz. This sampling rate generates 80 digital samples per 5 millisecond (ms) interval. Other sampling rates can also be used. If the signal is received via a network, it may already be in digital form.

The DSP 120 combines fixed numbers of sequential digital samples 220 into a temporal sequence of disjoint sets of samples, for example non-overlapping frames 230. Each set of samples, such as frame include 80 samples 220 to yield a 5 ms resolution. This resolution is long enough to give reliable estimates during subsequent processing, without making it too long to detect small changes in the signal.

In the preferred embodiment of the invention, the samples (y) of each set or frame are represented by a sufficient statistical description, for example an autocorrelation matrix (I). In an autocorrelation matrix, adjacent samples of the set are summed using a product summing technique. The matrix of autocorrelations I which represent a given number (L) of adjacent samples can be determined by:

$$I_{i,j} = \frac{1}{L}\sum_{t=1}^{t=L} y(t-i)y(t-j)$$

where, i=0, . . . , q, j=0, . . . , q, and L is the number of samples, e.g., 80 for a 5 ms set or frame, q, the number of autocorrelation shifts can approximately be in the range of 7 to 14.

Next, in a series of iterative steps, the distances between pairs of adjacent sets of samples 230 are determined. The samples of adjacent sets are merged to form a larger set of samples or clusters 240. For example, the cluster 242 takes the place of frames 231 and 232, and during a further iteration cluster 243 takes the place of clusters 241 and 242. The operation is repeated until the distance between any two adjacent sets of samples is at least the threshold value T to produce final sets of samples, e.g., clusters $C_k$ 250. For example, a final cluster 251 is a combination of clusters $C_{i-1}$ to $C_{i+2}$.

In the clustering processor 130, as described in greater detail below, adjacent sets or frames 230 are merged into larger disjoint sets according to a measurement of the difference or statistical "distance" between adjacent sets of samples. The distances are computed from the sufficient statistical description of the frames 230, e.g. the autocorrelation matrix I.

If the distance between the autocorrelation matrices I of two adjacent sets is less than some predetermined threshold T, then the samples of the sets are merged to form a larger set or cluster. Adjacent frames which have a small difference are likely to be part of the same statistically stationary unit, which represent, in the example embodiment, all or part of a corresponding linguistic element.

Therefore, the clusters $C_k$ 250 represent a possible segmentation of the continuous signal 210. The output of the cluster processor 130, e.g., clusters 250, and derived coefficients, such as the MFCCs also produced by the DSP 120 using traditional techniques, can be processed by the processor 140 to determine, for example, the linguistic elements which best characterizes each segment of the signal. The lexical decoder 150 can combine the linguistic elements to deduce possible words which best represent the combinations of statistically stationary units. The linguistic analyzer 160 is used to determine the actual speech content of the speech signal 210 based on grammatical rules, and the like.

More specifically, in the preferred embodiment, the cluster distance metrics are directly derived from the digital samples 220 using a linear predictive coding (LPC) model driven by white Gaussian noise. The standard LPC model for y(n) digital samples is:

$$y(n) = \sum_{i=1}^{q} a_i y(n-i) + v(n)$$

where $a_i$ y(n–i) is a linear prediction of the current sample based on q previous samples, and v(n) represents white, zero mean Gaussian process with variance V.

The LPC model is characterized by parameters $\theta=(\{a_i\}, V)$. The optimal value of the parameters, e.g., $\theta'$, is determined by maximizing the likelihood of the samples y over the parameters $\theta$. In addition, the number of LPC parameters which best describe a cluster can be selected by adding a minimum description length (MDL) to the likelihood of the samples y. The cluster distance is finally a distance determined using the parameter estimates ($\theta'$). The resulting likelihood $L(y_1^r/\theta')$ of a sequence of measurements $y_1^r$ is the likelihood of the associated residual:

$$\prod_{t=1}^{t=r} p(v(t) | y_{t-q}^{t-1}, \theta')$$

The value of this likelihood can be computed from the autocorrelation matrix I of the samples.

The cluster distance is expressed as the (log) likelihood ratio between the null hypothesis that two adjacent sets of samples, e.g., frames or clusters, are part of dissimilar or independent statistically stationary units, and the hypothesis that the two adjacent sets of samples are part of a single statistically stationary unit.

Figure 3:
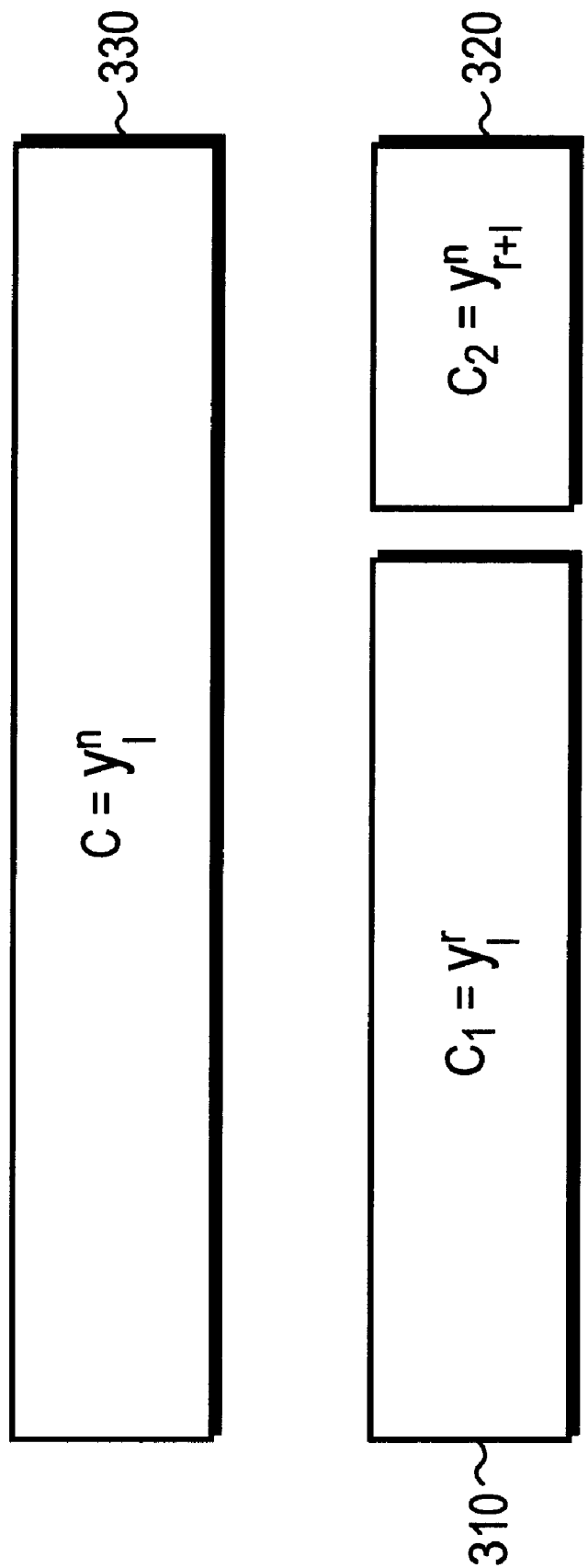
FIG. 3 is a block diagram of two clusters which may be merged into a single larger cluster.

For example, as shown in FIG. 3, the sets of digital samples 220 for two adjacent clusters $C_1$ 310 and $C_2$ 320, are $y_1^r$, and $y_{r+1}^n$, respectively, in which case the set of samples for the potential merged cluster C 330 are $y_1^n$. In this case, the cluster distance $d(C_1, C_2)$ is the generalized likelihood ratio:

$$\underset{\theta, \theta_1, \theta_2}{\text{MAX}} \frac{L(y_1^r | \theta_1) L(y_{r+1}^n | \theta_2)}{L(y_1^n | \theta)}$$

If this ratio is less than a threshold T, the samples of the clusters 310 and 320 should be merged to form cluster 330 since they are more likely to be part of the same statistically stationary unit. If the ratio is greater than the threshold, then the samples of the clusters 310 and 320 should not be merged. Discriminating merging can be performed if threshold T is set to an appropriate value.

Figure 4:
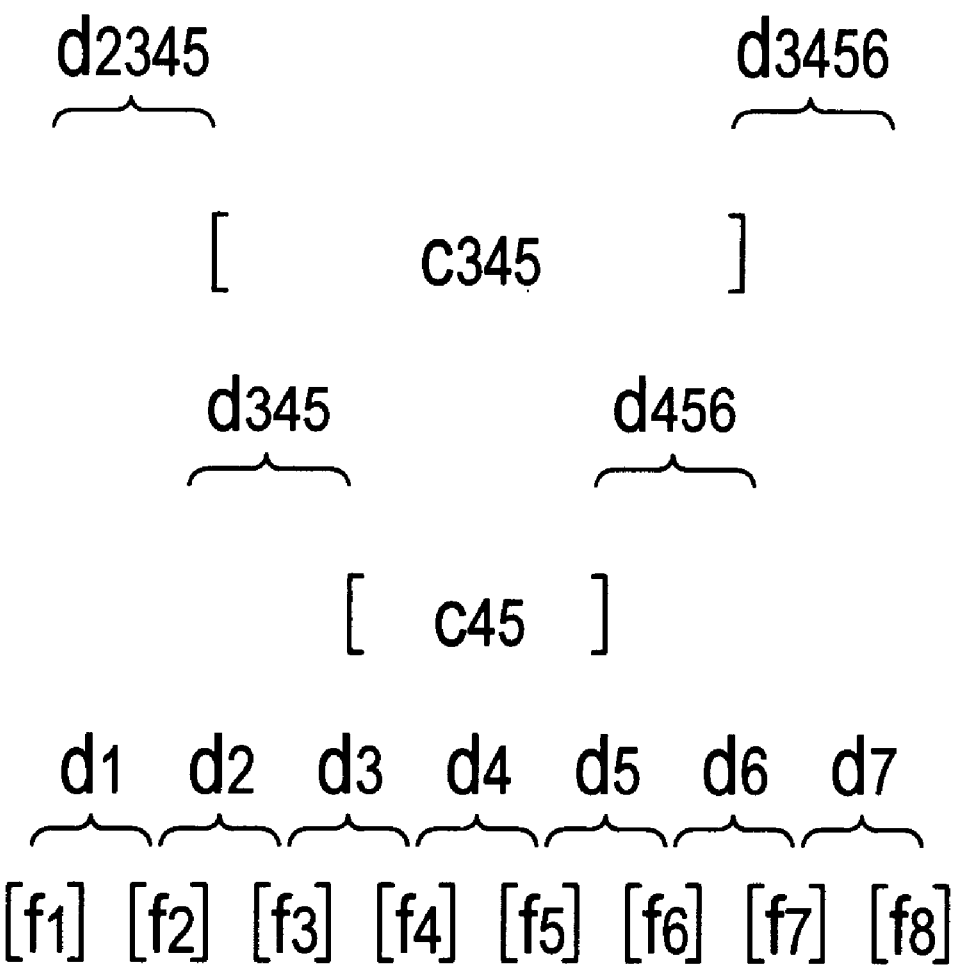
FIG. 4 is a schematic diagram of frames, distances, and merged frames.

FIG. 4 shows a preferred "bottom-up" clustering in greater detail. In FIG. 4, items f1 to f8 represent the correlation matrices derived from the disjoint sets of samples of eight successive frames 230 of FIG. 2. The distances d1 through d7 represent the respective statistical distances between the samples of adjacent pairs of frames. A determination is made to see which of the distances d1–d7 is the smallest, yielding, for example, d4. If smallest distance d4 is less than the threshold value T, the samples of the frames f4 and f5 are merged to form an initial cluster c45. That is, cluster c45 replaces f4 and f5. The frames can be merged by summing the autocorrelation matrices of the samples. After merging, the distance between f3 and c45, and c45 and f5 are recomputed as d345 and d456.

The process of finding the smallest distance is repeated for the distances d1, d2, d345, d456, d6, and d7 to determine a new smallest distance. If the new smallest distance, for example d345, is still below the threshold T, merging of f3 and c45 takes place to form cluster c345, and the distances are recomputed as d1, d2, d2345, d3456, d6, and d7. These steps are repeated until all of the distances between adjacent sets of samples are at least the threshold value.

This bottom-up merging is a "greedy" merging, i.e., a merging algorithm that makes a locally optimal choice in the hope that this choice will lead to a globally optimal choice. Greedy merging may result in a clustering of frames where the total distances between all adjacent final sets is more than some least distance. Alternatively, the frames could possibly be merged in an optimal manner where the sum total distances is less than the total distance derived by pair-wise greedy merging.

For the purpose of phonetic recognition, segmentation based on a greedy merging may give better results than optimal merging. As an additional advantage, bottom-up adjacent merging only increases linearly in processing time as the number of segments increase, whereas with top-down optimal merging, the time required to process may increase quadratically with the number of segments.

Application of this statistical clustering technique shows deletion rates, for the same insertion rate, which are about half that of clustering techniques based on observation vectors derived using fast Fourier transforms. Moreover, the latter tends to smooth spectral estimates, which decreases the likelihood of detecting spectral changes. Although the clustering technique is described with respect to a speech recognition system, it should be understood that the technique can also be used in other speech processing systems requiring the identification of phonetic units.

In addition, it should now also be apparent to those skilled in the art that the present clustering technique can be applied to any digitally sampled continuous signal that can be represented as a sequence of discrete statistically stationary sets of samples. The initial sets only need to have a sufficient number of samples to provide robust estimates of the linear predictive coding parameters. The number of samples in the initial sets of samples may be very large, as long as the samples of the initial sets are essentially statistically stationary with respect to each other.

Improved segmentation results can be achieved in any application where the desired segmentation is characterized by changes in the spectral characteristics of the digitally sampled signal over time. Thus the present clustering technique can be applied to segmenting other digitally sampled signals such as, but not limited to, turbine signatures, cosmic waves, force measurements during robot assembly, aircraft vibration measurements, and the like.

The principles of the invention have been described with respect to specific embodiments. It will be apparent to those skilled in the art that various modifications can be made to the embodiments shown. Therefore, the spirit and scope of the invention are set out in the appended claims.

What is claimed is:

1. A computerized method for segmenting a signal, comprising:

sampling the signal at periodic intervals to produce a sequence of digital samples;

partitioning the digital samples into a plurality of sets of samples;

summing a product of adjacent samples of each set of samples to produce an autocorrelation matrix of the samples of each set of samples;

measuring a distance between adjacent sets of samples using the autocorrelation matrix of the samples of each set of samples to determine a set of distances; and merging adjacent sets of samples if the distance between the adjacent sets of samples is less than a predetermined threshold value.

2. The method of claim 1 further comprising:

repeatedly measuring and merging adjacent sets of samples as long as the distance between adjacent sets of samples is less than the predetermined threshold value to segment the continuous signal into statistically stationary units.

3. The method of claim 1 wherein the step of representing further comprises:

summing the autocorrelation matrices of the merged pair of adjacent sets of samples.

4. The method of claim 1 wherein each set of samples includes an identical number of samples prior to performing the step of merging.

5. The method of claim 2 further comprising:

selecting an optimal number of parameters to describe each set of samples using a minimum description length likelihood.

6. The method of claim 1 further comprising:

determining a least distance of the set of statistical distances; and first merging adjacent sets of samples having the least statistical distance.

7. The method of claim 1 wherein the continuous signals are speech signals.

8. The method of claim 2 wherein the continuous signals are speech signals and the statistically stationary units relate to linguistic elements.

9. A system of processing a sequence of digital samples partitioned into a plurality of non-overlapping sets of samples, said sequence of digital samples being produced by sampling a signal at periodic intervals, the system comprising:

a memory for storing the sequence of digital samples produced by sampling the signal at periodic intervals, the sequence of digital samples being partitioned into the plurality of non-overlapping sets of samples; and at least one processor coupled to the memory, the at least one processor configured to:

sum a product of adjacent samples of each set of samples to produce an autocorrelation matrix of the samples of each set of samples;

measure a distance between a first of the plurality of non-overlapping sets of samples and a second of the plurality of non-overlapping sets of samples using the autocorrelation matrix; and merge the first of the plurality of non-overlapping sets of samples and the second of the plurality of non-overlapping sets of samples if the distance is less than or equal to a particular value.

10. The system of claim 9, wherein the at least one processor is a single processor.

11. An article of manufacture for segmenting a continuous signal represented by a sequence of digital samples partitioned into a plurality of non-overlapping sets of samples, said sequence of digital samples being produced by sampling said signal at periodic intervals, the article of manufacture comprising:

a computer readable storage medium; and computer programming stored on the storage medium;

wherein the stored computer programming is configured to be readable from the computer readable storage medium by a computer and thereby cause the computer to operate so as to:

sum a product of adjacent samples of each set of samples to produce an autocorrelation matrix of the samples of each set of samples;

measure a first distance between a first of the plurality of non-overlapping sets of samples and a second of the plurality of non-overlapping sets of samples using the autocorrelation matrix; and merge the first of the plurality of non-overlapping sets of samples and the second of the plurality of non-overlapping sets of samples if the first distance is less than or equal to a particular value to segment the continuous signal into a statistically stationary unit.

12. The article of manufacture of claim 11, wherein the stored computer programming is further configured to cause the computer to operate so as to:

measure a second distance between a third of the plurality of non-overlapping sets of samples and a fourth of the plurality of non-overlapping sets of samples; and merge the third of the plurality of non-overlapping sets of samples and the fourth of the plurality of non-overlapping sets of samples if the second distance is less than or equal to the particular value.

13. The article of manufacture of claim 12, wherein the stored computer programming is further configured to cause the computer to operate as to:

determine the smaller of the first distance and the second distance; and merge the ones of the plurality of non-overlapping sets of samples corresponding to the determined smaller distance before merging others of the plurality of non-overlapping sets of samples.

14. The article of manufacture of claim 12, wherein the third of the plurality of non-overlapping sets of samples corresponds to the merged first of the plurality of non-overlapping sets of samples and the second of the plurality of non-overlapping sets of samples.

15. A method for forming segments of a sequence of digital samples partitioned into a plurality of sets of samples, the method comprising the steps of:

receiving a sequence of digital samples;

partitioning the sequence of digital samples into the plurality of sets of samples;

determining a first generalized likelihood ratio of the distances of a first pair of adjacent sets of samples being separate and the first pair of adjacent sets of samples being merged into a single set of samples; and merging the first pair of adjacent sets of samples if the first generalized likelihood ratio is less than or equal to a particular value to form a statistically stationary unit.

16. The method of claim 15, further comprising the steps of:

determining a second generalized likelihood ratio of the distances of a second pair of adjacent sets of samples being separate and the second pair of adjacent sets of samples being merged into a single set of samples; and merging the second pair of adjacent sets of samples if the second generalized likelihood ratio is less than or equal to the particular value.

17. The method of claim 1 further comprising:

determining a generalized likelihood ratio of the distances of the pair of adjacent sets of samples being separate and the pair of adjacent sets of samples being merged into a single set of samples.

* * * * *